June 23, 1964 B. LEBKUCHNER 3,138,106
PUMP
Filed Oct. 27, 1961
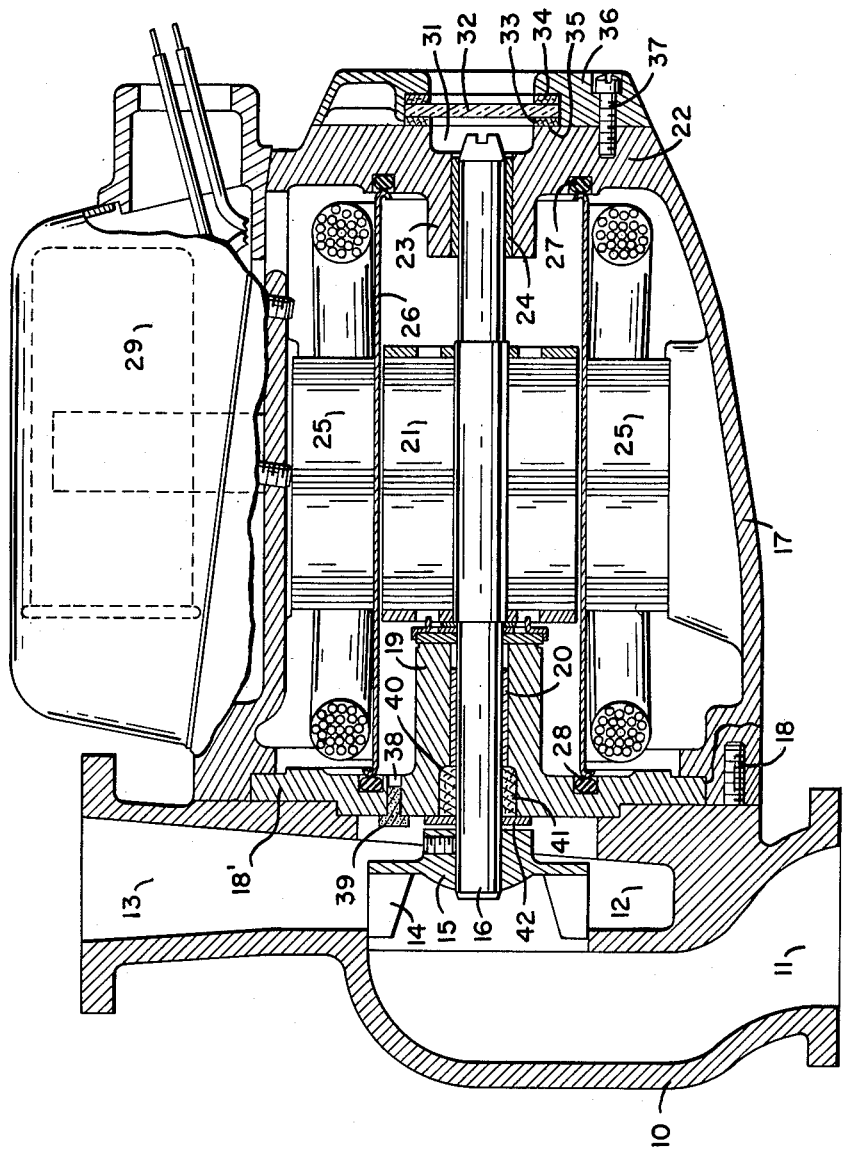
INVENTOR.
BENNO LEBKUCHNER
BY
Robertson & Smythe
ATTORNEYS United States Patent Office 3,138,106
Patented June 23, 1964

3,138,106
PUMP
Benno Lebkuchner, Cranston, R.I., assignor to Taco, Inc.,
a corporation of New York
Filed Oct. 27, 1961, Ser. No. 148,149
2 Claims. (Cl. 103—87)

This invention relates to circulating pumps, such as those adapted for use in hot water heating systems, and particularly to a totally enclosed unitary electric motor and pump combination of the type in which the pump and motor are lubricated by the liquid being pumped.

In pump and motor arrangements which are not of the unitary enclosed type, problems arise in preventing the liquid being pumped from leaking from stuffing boxes or seals through which the motor and pump shaft normally must pass. Pumps of the above described type must operate in substantially a noiseless manner, must be capable of being readily freed in the event they become clogged by dirt or grit in the system to which they are applied, and must maintain the liquid in intimate contact with the bearings to be lubricated without leaking to the atmosphere. Foreign matter such as iron oxide from the heating system may collect on the rotor of the motor and such is undesirable.

One of the objects of the invention is to provide a unitary enclosed motor and pump arranged so that foreign matter that may cause malfunctioning of the motor is excluded from the motor rotor.

Another of the objects of this invention is to provide an enclosed motor and pump combination arranged to operate without external lubrication while insuring adequate lubrication of the bearings throughout the life of the assembly.

In one aspect of the invention, a liquid-tight housing may be provided as described in Patent No. 2,920,575 such having an access aperture therein and fluid inlet and outlet connections to the pump impeller which latter preferably is of the centrifugal type. An electric motor and a rotary type centrifugal pump operated thereby is enclosed in the housing in such a manner that the liquid being pumped is free to pass at least over the rotor of the motor and to completely lubricate the bearings of the pump and motor shaft at all times. In order to prevent foreign matter from reaching the rotor, a dividing or end plate having apertures therein with a filter plug is provided. The plug preferably is made of powdered metal. A felt filtering body also could be used. In a further aspect, a cavity is provided surrounding one of the bearings, the cavity being filled with felt so that water can pass to the bearing but not foreign matter.

The above as well as other objects, advantages and features of the invention will become apparent from the following description and drawings which are merely exemplary.

In the drawing:

The figure is a sectional elevational view of a pump and motor combination to which the principles of the invention have been applied.

Referring to the drawing, a base 10 may include an inlet 11, an impeller chamber 12 and an outlet 13. A centrifugal impeller 14 may be located within the chamber 12 and it may include a hub 15 fixed to one end of a shaft 16. A motor base 17 may be removably bolted to the base 10 by bolts 18. The end of motor base 17 adjacent impeller 14 may be closed by an end plate 18' which may include a boss 19 having a bearing 20 within which the front end of shaft 16 is journaled. An electric motor rotor 21 may be fixed to shaft 16. The motor base 17 may include an end plate 22 having a boss 23 including a bearing 24 within which the rear end of shaft 16 is journaled.

A motor stator 25 may be located within the motor base 17, and it must be maintained free from moisture or the liquid being pumped. Since the bearings 20 and 24 are adapted to be lubricated solely by the liquid, such as water being pumped, a tubular housing 26 of non-magnetizable material surrounding the rotor 21 may extend between plates 18' and 22 and may be sealed at each end thereof by resilient sealing rings 27 and 28 which may be made of rubber or any other suitable material. The usual electrical connections for stator 25 may be enclosed within a housing 29 on the base 17. The windings also could be encased in a suitable plastic.

In one form, the end cap or plate 22 may be provided with a cavity or chamber 31 surrounding the end of the shaft 16, and it may be closed by a transparent closure 32 by a joint that will permit the escape of accumulated gas therein without permitting the escape of the liquid within the system as described in said Patent No. 2,920,575.

It has been found that the unrestricted passage of the liquid, such as water that is circulated through a heating system, causes deposits of foreign matter, for example black iron oxide from the interior of the heating system lines onto the rotor 21 of the motor, thereby causing it to malfunction. In the present embodiment of the invention, this detrimental foreign matter is excluded from the chamber defined by the tubular housing 26 while still permitting the flow of the liquid being pumped therein so that bearings 20 and 24 are adequately lubricated.

The front plate 18' may be provided with one or more through passages 38 within which are located plugs 39 that are made from powdered metal. In the form shown, the plugs are headed. It has been found that such plugs permit the passage of the liquid being pumped but exclude foreign matter such as black iron oxide as well as other deleterious materials within the system.

Plate 18' may also be provided with a pocket 40 terminating at the one end of bearing 20. The pocket 40 may be filled with a felt or other fibrous material 41 capable of passing the liquid being pumped, and a thrust washer 42 may be fixed to shaft 16 and located at the entrance to the pocket 40. The felt in pocket 40 ensures the passage of the liquid being pumped to the bearing 20, thence to the interior of housing 26. The felt-filled pocket 40 and the powdered metal plugs 39 may be used alone or in combination with each other.

Although the various features of the new and improved pump have been shown and described in detail to fully disclose one embodiment of the invention, it will be evident that changes may be made in such details and certain features may be used without others without departing from the principles of the invention.

What is claimed is:

1. In a unitary liquid pump and motor, a casing having end plates attached thereto; a base member affixed to said casing and abutting one of said end plates, said base member having an inlet and an outlet between which is located a single impeller chamber; aligned bearings on each of said end plates; a shaft journaled in said bearings; a motor rotor fixed to said shaft within said casing; a motor stator within said casing; means forming a rotor chamber surrounding said rotor and hermetically sealing said stator from said rotor; an impeller connected to said shaft and located within said impeller chamber; porous means in the end plate to which said base member is fixed surrounding said shaft and leading to one of said bearings; filter means spaced from said porous means on said end plate to which the base member is fixed; and means attached to the end plate opposite that abutting said base member for passing entrapped air from said rotor chamber without passing liquid.

2. In a unitary liquid pump and motor, a casing having end plates attached thereto; a base member fixed to said casing and abutting one of said end plates, said base member having an inlet and an outlet between which is located a single impeller chamber; aligned bearings on each of said end plates; a shaft journaled in said bearings; a motor rotor fixed to said shaft within said casing; a motor stator within said casing; means forming a rotor chamber surrounding said rotor and hermetically sealing said stator from said rotor; an impeller connected to said shaft and located within said impeller chamber; means including a felt body in the end plate to which said base member is fixed and surrounding said shaft and leading to one of said bearings; means including plug means made of powdered metal located in the end plate to which said base member is fixed, and within the confines of said rotor chamber, said plug means being spaced from said felt means; and means attached to the end plate opposite that abutting said base member for passing entrapped air from said rotor chamber without passing liquid.

References Cited in the file of this patent

UNITED STATES PATENTS

| | | |
|---|---|---|
| 2,064,070 | Mapes et al. | Dec. 15, 1936 |
| 2,814,254 | Litzenberg | Nov. 26, 1957 |
| 2,851,956 | Lung | Sept. 16, 1958 |
| 2,871,791 | Litzenberg | Feb. 3, 1959 |
| 2,920,575 | White et al. | Jan. 12, 1960 |
| 2,931,307 | Smith | Apr. 5, 1960 |